US012707492B2

(12) United States Patent
Konanur

(10) Patent No.: US 12,707,492 B2
(45) Date of Patent: Aug. 11, 2026

(54) SYSTEMS AND METHODS FOR TEMPORARY PREFERENTIAL DOWNLINK ACCESS IN A WIRELESS NETWORK

(71) Applicant: Verizon Patent and Licensing Inc., Basking Ridge, NJ (US)

(72) Inventor: Venkatesh Konanur, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 370 days.

(21) Appl. No.: 18/192,639

(22) Filed: Mar. 29, 2023

(65) Prior Publication Data

US 2024/0334472 A1 Oct. 3, 2024

(51) Int. Cl.

| | |
|---|---|
| ***H04W 72/566*** | (2023.01) |
| ***H04W 8/18*** | (2009.01) |
| ***H04W 28/20*** | (2009.01) |
| ***H04W 72/1273*** | (2023.01) |

(52) U.S. Cl.

CPC ........... *H04W 72/569* (2023.01); *H04W 8/18* (2013.01); *H04W 28/20* (2013.01); *H04W 72/1273* (2013.01)

(58) Field of Classification Search

CPC ........... H04W 72/569; H04W 72/1273; H04W 72/51; H04W 8/18; H04W 28/20; H04W 72/23; H04W 72/0446; H04W 72/04; H04W 72/12; H04W 72/006; H04W 24/02

USPC ....... 370/329, 235, 395.4, 395.42, 280, 294, 370/468; 455/450

See application file for complete search history.

(56) References Cited

U.S. PATENT DOCUMENTS

| | | | | |
|---|---|---|---|---|
| 7,260,079 | B1 * | 8/2007 | Chapman | H04W 28/20 370/335 |
| 8,326,312 | B2 * | 12/2012 | Shah | H04W 4/12 370/230 |
| 8,559,455 | B1 * | 10/2013 | Yuan | H04W 16/14 370/444 |
| 9,641,642 | B2 * | 5/2017 | Gopalakrishnan | H04M 15/8214 |
| 2003/0121047 | A1 * | 6/2003 | Watson | H04N 21/266 348/E7.071 |
| 2006/0026692 | A1 * | 2/2006 | Lakhani | G06F 21/31 726/28 |
| 2007/0047478 | A1 * | 3/2007 | Balachandran | H04W 72/56 370/328 |
| 2015/0072662 | A1 * | 3/2015 | Chandrasekaran | H04W 76/23 455/414.1 |
| 2015/0124607 | A1 * | 5/2015 | Kotecha | H04W 72/569 370/235 |

(Continued)

*Primary Examiner* — Ricardo H Castaneyra

(57) ABSTRACT

A scheduler device may receive a request to download a content item to a user equipment via a communication network, identify a download path from a storage device of the content item to the user equipment, with the download path including a network device of the communication network. The scheduler device may further determine a duration of time to allocate for downloading of the content item, with the duration of time being determined based on subscriber information associated with the user equipment, the download path, and a size of the content item. Further, the scheduler device may allocate, for the duration of time, a resource of the network device to download the content item to the user equipment via the download path.

20 Claims, 6 Drawing Sheets

(56) References Cited

U.S. PATENT DOCUMENTS

| | | | | |
|---|---|---|---|---|
| 2015/0153176 | A1* | 6/2015 | Lim | H04W 4/02 701/408 |
| 2016/0135125 | A1* | 5/2016 | Vyas | H04W 52/028 370/311 |
| 2016/0295345 | A1* | 10/2016 | Oh | H04L 5/14 |
| 2018/0027453 | A1* | 1/2018 | Viger | H04W 74/0816 370/336 |
| 2024/0089296 | A1* | 3/2024 | Murphy | H04L 45/645 |

* cited by examiner

SYSTEMS AND METHODS FOR TEMPORARY PREFERENTIAL DOWNLINK ACCESS IN A WIRELESS NETWORK

BACKGROUND

An end user mobile device (e.g., a user equipment) is a hardware component that can establish a wireless connection to a wireless network. In some situations, the end user mobile device can establish a wireless connection to download a comparatively large content item.

DETAILED DESCRIPTION OF PREFERRED EMBODIMENTS

Figure 1A:
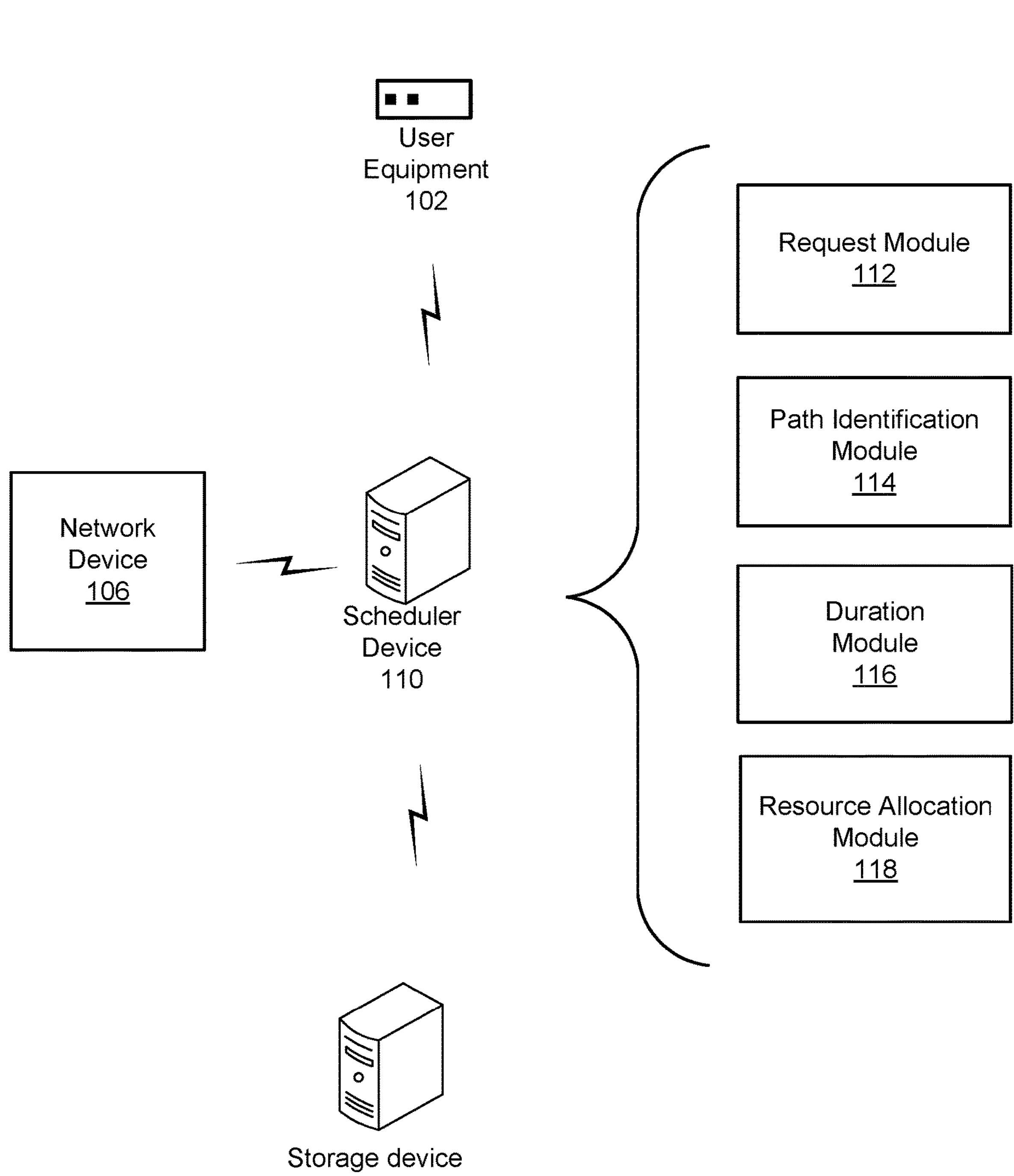
FIGS. 1A-1C are diagrams of an example associated with providing temporary preferential downlink access for downloading content items.

The following detailed description of example implementations refers to the accompanying drawings. The same reference numbers in different drawings may identify the same or similar elements.

A user equipment (UE) may establish a connection in accordance with fifth generation (5G) wireless technology. In some instances, with the higher bandwidth available in a 5G wireless network, the connection may be used to replace and/or augment a typical wired network connection provided to a home or a business. The UE may be a fixed wireless access (FWA) device and may therefore be used in a fixed or stationary position. When used to provide high-bandwidth connectivity, FWA devices may be used to perform tasks that are typically only performed via a wired network. The tasks may include downloading large content items (e.g., content items with sizes that exceed a size threshold).

Because wireless networks are typically configured to provide balanced wireless access to many mobile devices, wireless networks often do not provide high performance when downloading content items as compared to a wired network. A content item may include text data, image data, video data, among other examples. The content item may be provided from a network source to an end user device (e.g., from a server to the end user device).

Typical wireless protocols do not use characteristics and a storage location of a content item to improve the performance of downloading the content item. In addition, a request (to download a large content item via a wireless network) is typically not utilized to allocate resources of a provider network to improve a performance of downloading the large content item. A large content item may refer to a content item with a size that satisfies a size threshold (e.g., a size that is greater than 100 MB).

Stated differently, wireless networks were designed to reliably communicate comparatively small content items to mobile, battery-dependent end user devices. A small content item may refer to a content item with a size that does not satisfy the size threshold. Thus, when an FWA device is used to download a large content item, features of a typical wireless network that may improve an operation of the typical wireless network, may inhibit the quality of a connection by the FWA device to the typical wireless network. Typical wireless network features may include promotion of mobility for mobile devices, priority for delivery of small content items, measures to conserve a battery of mobile devices, among other examples.

As a result of the operation of the connection being inhibited, the FWA device (and one or more other end user devices connected to the FWA device) may be subject to a degraded performance when downloading large content items. As a result of the degraded performance when downloading large content items using wireless connections, user satisfaction decreases at least because users are forced to wait for a download to complete or seek alternative connections to reduce wait times. For example, the FWA device may wait for the download to complete or may be configured to seek alternative connections to reduce wait times. Other issues may occur because certain types of large content items may not be able to be successfully downloaded without increasing the quality of service (QOS). Increasing the QoS may ensure successful downloads of large content items. For example, in some situations, one or more Internet of Things (IoT) devices may be connected to the FWA device and the FWA device may be operating as a non-IoT aggregator device. In such situations, the FWA device may not be able to successfully download a large content item for the one or more IoT devices due to the need to increase the QoS for the download. For example, the FWA device may not be able to successfully download a firmware over-the-air (FOTA) update for the one or more IoT devices. Accordingly, a QoS class identifier (QCI) may need to be modified (e.g., increased) to account for download requests for large content items. The need to increase the QoS may be based on reception capabilities of the FWA device and/or interference conditions associated with the FWA device receiving content items.

Given the rise in popularity of new uses for wireless connections, combined with the expectation of users for regular increases in the level of performance from devices, these types of problems, where the performance of a wireless connection when downloading large content items does not match the expectation of users, will only continue to become more prevalent.

Current approaches for wirelessly downloading content items can consume network resources and/or computing resources, among other resources. For example, without managing the availabilities of network devices for downloading large content items, additional time may be required to download the content items because insufficient resources may be available for the downloads.

Also, without planning the download of a large content item at a time of low network usage, computing resources may already be allocated to serve other user equipment connected to the wireless network. Thus, the current 5G wireless network approaches to downloading large content items to user equipment inefficiently utilizes computing resources (e.g., processing resources, memory resources, communication resources, and/or the like), networking resources, and/or resources associated with utilizing network devices to download a large content item to a user equipment.

Some implementations described herein relate to a scheduler device that can mitigate effects of the problems noted above with respect to downloading large content items. The scheduler device may grant temporary preferential downlink access to a UE for the download of a content item requested by the UE. In some examples, the UE may be an FWA device. Preferential downlink access may refer to granting the UE preferential access to network devices used to download the content item. For example, the scheduler device may allocate a sufficient amount of bandwidth for downloading the content item and may ensure that a reliable connection is maintained between the UE and the storage device that stores the content item. The scheduler device may allocate the amount of bandwidth and may ensure the reliable connection based on a network topology of an access network and/or a core network associated with the UE. The network topology may identify network devices that may be used to allocate the amount of bandwidth and used to ensure the reliable connection. In some examples, the preferential downlink access may be made available and maintained for a duration requested for downloading the content item. For example, the scheduler device may grant preferential access to an amount of bandwidth, on a downlink, for downloading large content items stored on far-edge servers and/or on near-edge servers. Providing the access to the amount of bandwidth in this manner may enable the large content items to be downloaded at a rate that exceeds a rate of the current approaches discussed above. Additionally, providing the access to the amount of bandwidth in this manner may enable the large content items to be downloaded via a quality of service that exceeds a quality of service of the current approaches discussed above. Other approaches to granting preferential downlink access may include assigning a QCI to the download to minimize network latency and packet loss, and may include selecting a route for the download via network devices that minimize download delays.

To maintain overall network performance by limiting the duration of the granted preferential downlink access, implementations described herein may grant temporary preferential downlink access for a period of time corresponding to an estimated amount of time required for downloading the content item. In this way, the scheduler device can improve the performance of the download of the content item, while minimizing potential disruption of other aspects of a wireless network used for downloading the content item. For example, by managing the allocation of resources for downloading the content item, the scheduler device can help to maintain high performance for the download, as well as maintain high performance for other devices utilizing the wireless network.

The scheduler device improves the user experience by reducing the wait time for the content item, and thus reducing the likelihood that the UE will switch to a faster and more reliable way of receiving broadband access. Additional benefits of some implementations described herein include reducing the amount of time that a large content item (being downloaded) consumes network resources. Improving the efficiency of downloading large content items using a wireless connection can reduce the inefficient utilization of network resources, computing resources, among other resources that would have otherwise been inefficiently allocated to download the large content items.

In some implementations, prior to granting the temporary preferential downlink access, the scheduler device may determine whether the UE is authorized to receive the temporary preferential downlink access. For example, the scheduler device may analyze subscriber information (associated with the UE) to determine whether the UE is authorized to receive the temporary preferential downlink access.

While the description herein generally references unspecified content items of different sizes, the description herein is broadly applicable to different types of content items that may be transferred from a storage device to a UE for use on the UE. The different types of content may include application updates, data files, and/or multimedia content, among other examples.

Figure 1B:
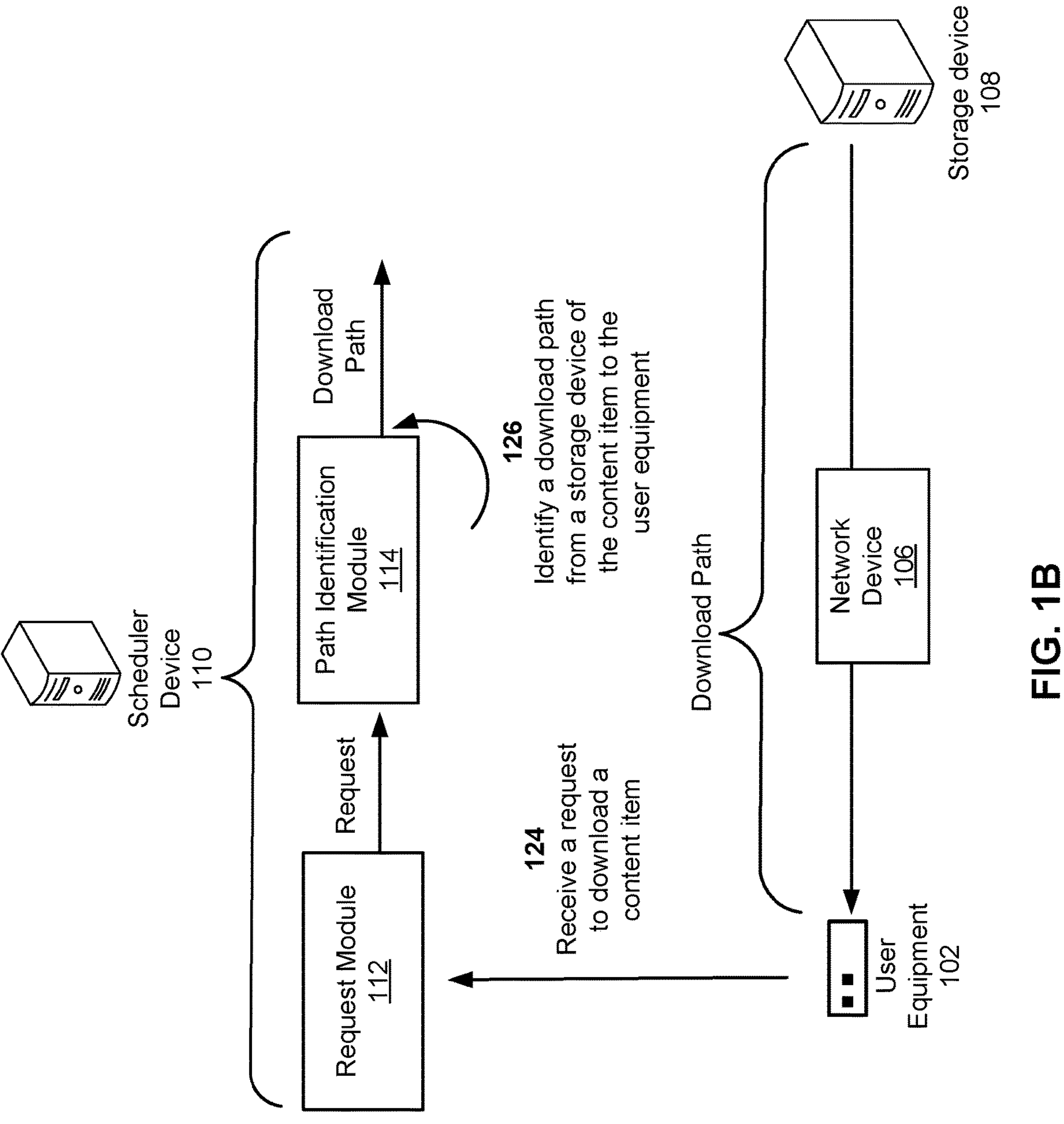
Figure 1C:
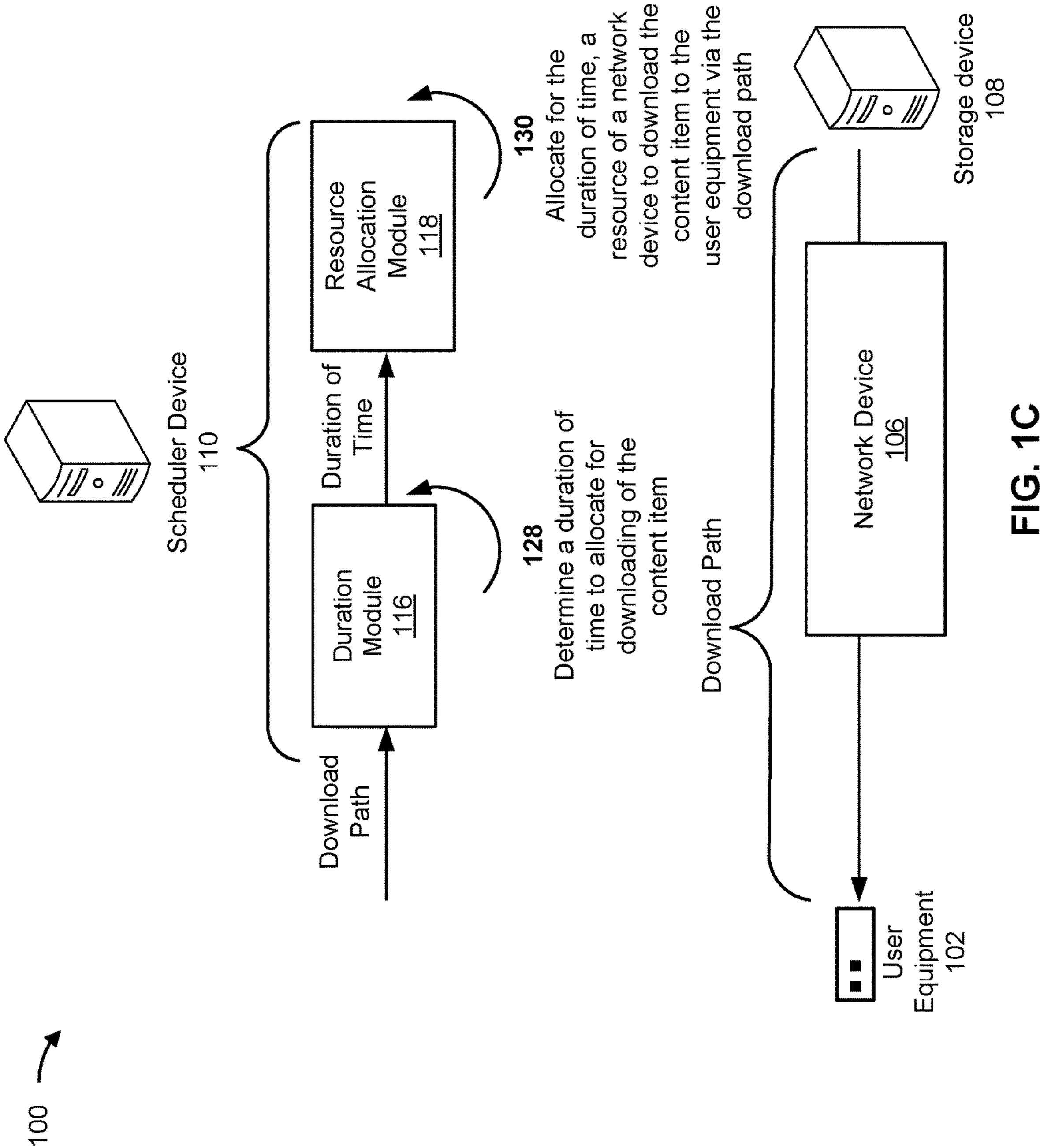

FIGS. 1A-1C are diagrams of an example 100 associated with providing temporary preferential downlink access for downloading content items. As shown in FIG. 1A, example 100 includes a user equipment 102, a network device 106, a storage device 108, and a scheduler device 110. User equipment 102, network device 106, storage device 108, and scheduler device 110 are described in more detail below in connection with FIGS. 2 and 3. In the description to follow and merely as an example, a user may utilize user equipment 102 to request a download of a content item via network device 106 from storage device 108.

User equipment 102 may include one or more devices capable of receiving, generating, storing, processing, and/or providing information associated with providing a temporary preferential downlink access, as described elsewhere herein. User equipment 102 may include a communication device and a computing device. For example, user equipment 102 may include an FWA device that is a customer premises equipment (CPE), an antenna, a transceiver, and/or a router, among other examples. User equipment 102 may be configured to establish a connection with a base station to provide Internet access to mobile devices connected to user equipment 102. The mobile devices may include a mobile phone, a UE, a laptop computer, a tablet computer, and/or a desktop computer, among other examples.

Network device 106 may include one or more devices capable of receiving, generating, storing, processing, and/or providing information associated with providing a temporary preferential downlink access, as described elsewhere herein. Network device 106 may include any device that may be used to relay the content item along a download path (e.g., from storage device 108 to user equipment 102). The description herein can broadly apply to elements of a provider network, an access network, and a core network. For example, network device 106 may include data center servers, core network nodes, gateways, access network nodes, edge nodes, session management servers, routers, switches, base stations, multi-access edge computing (MEC) devices.

Storage device 108 may include one or more devices capable of receiving, generating, storing, processing, and/or providing information associated with providing a temporary preferential downlink access, as described elsewhere herein. Storage device 108 includes a device or collection of devices that may store content items for retrieval. For example, storage device 108 may include data servers that may be located outside of a provider network (e.g., far-edge servers and/or cloud servers). Storage device 108 may also include data servers deployed within an access network. For example, storage device 108 may include MEC devices that store content items for low latency downloads (e.g., near-edge servers).

Scheduler device 110 may include one or more devices capable of receiving, generating, storing, processing, and/or providing information associated with providing a temporary preferential downlink access, as described elsewhere herein. For example, scheduler device 110 may include one or more devices configured to receive a request to download a content item to user equipment 102 via a communication network. Additionally, scheduler device 110 may be configured to provide temporary preferential downlink access to user equipment 102.

As shown in FIG. 1, scheduler device 110 may include a request module 112, a path identification module 114, a duration module 116, and a resource allocation module 118. Request module 112 may include one or more devices configured to receive requests to download content items. In some implementations, before allocating resources, scheduler device 110 may verify a priority assigned to user equipment 102. The priority may indicate whether user equipment 102 is authorized to receive temporary preferential downlink access. In an example, a priority may be verified by accessing and analyzing subscriber information regarding user equipment 102. The subscriber information may include information identifying user equipment 102, such as a serial number of user equipment 102, a network address associated with user equipment 102, an international mobile subscriber identity associated with user equipment 102, and/or an international mobile subscriber identity associated with user equipment 102, among other examples. In some implementations, the subscriber information may be stored in a memory associated with scheduler device 110. In some implementations, the subscriber information may be included in a list that identifies devices authorized to receive temporary preferential downlink access.

Path identification module 114 may include one or more devices configured to determine download paths for downloading the content items from source devices of the content items to destination devices of the content items. In some implementations, scheduler device 110 may resolve the download path based on routing conditions between user equipment 102 and storage device 108. For instance, scheduler device 110 may resolve the download path based on the routing conditions between a location of user equipment 102 and/or a location of storage device 108 within a network topology of the wireless network. Network devices, of the wireless network, may make requests based on optimized routes for providing the content item from storage device 108 to user equipment 102. The optimized routes may be routes with minimal hops from storage device 108 to user equipment 102 (e.g., least cost routing). The network devices may be included in the download path and may use the optimized routes to provide the content item from storage device 108 to user equipment 102. Based on network device 106 being in the download path, in an implementation, scheduler device 110 may allocate resources of network device 106 to download the content item to user equipment 102 for the duration of time determined to be required for the download.

Duration module 116 may include one or more devices configured to determine durations for downloading the content items. Scheduler device 110 may determine a duration of time to allocate for downloading of the content item based on the priority, the download path, and a size of the content item. Scheduler device 110 may determine the size of the content item based on content information regarding the content item. The content information may be included in the request for the content item.

Resource allocation module 118 may include one or more devices configured to allocate resources for downloading the content items. For example, resource allocation module 118 may configured to allocate bandwidth to enable the contents items to be downloaded at a rate that satisfies a rate threshold (e.g., a rate that exceeds a rate of the current approaches discussed above). For instance, resource allocation module 118 may allocate an amount of bandwidth of network device 108 to enable the content item to be downloaded at a rate that exceeds a rate of download of current approaches.

As shown in FIG. 1B, and by reference number 124, the request module 112 of scheduler device 110 may receive a request from a UE to download a content item from a storage device. For example, scheduler device 110 may receive a request from user equipment 102 for temporary preferential downlink access to a downlink connection for downloading a content item from storage device 108. In some examples, the content item may be a large content item. In other words, a size of the content item may satisfy a size threshold. For instance, the size of the content item may exceed 100 MB.

While the description herein references the download of a large content item from storage device 108, the description is applicable to any size or type of content item. Additionally, while the description herein references a "request" from a user equipment 102, the description is applicable to any communication that provides information for the operation of scheduler device 110. For example, the communication may include application programming interface (API)) calls (made within software running on user equipment 102) that are unknown to an operator of user equipment 102).

In an example, the request may include content information about the content item to be downloaded as well as download information about when the download is requested to start and/or to finish. The content information about the content item may include a size of the content item, a type of the content item, a location of the content item, among other examples. In some implementations, the download information may include parameters that specify a requested time for the download to commence and a requested completion time for the download to complete. The parameters may be used by scheduler device 110 to select resources for allocation to the download as well as the starting and ending times that resources are allocated.

An additional aspect of the resources that may be selected by scheduler device 110 based on the parameters is a time of day for commencing the resource allocation and the download of the content item. For example, in some implementations, the time of day may be selected to align the download with a user preferred time for receiving the content item and/or the time of day may be selected avoid times of congestion for the download of the content item.

Further, while the description herein references requests "from" user equipment 102, the description herein is applicable to requests from any process, including requests from devices inside or outside the provider network. In an example where a game console connects to user equipment 102, scheduler device 110 may receive a gaming update request from a gaming provider to download a large content item from a server (e.g., an original equipment manufacturer (OEM) server) located outside of the provider network. In this example, the large content item may be a large game update data object downloaded from storage device 108 hosted by the gaming provider. Additionally or alternatively, the example gaming update request may originate, without involvement of a user or the gaming provider, from the gaming console. In other words, the example gaming update request may originate from the gaming console automatically.

In some implementations, user equipment 102 may be an FWA device coupled to the communication network via a network device 106. The communication network may be a wireless network and network device 106 may include a base station. Resources of the base station may be allocated for downloading the content item.

While some of the examples herein reference user equipment 102 being an FWA device, the description herein is applicable to a UE with any level of mobility (e.g., moving, permanently stationary, or temporarily stationary). In some circumstances, because user equipment 102 is stationary, scheduler device 110 may manage network device 106 in a manner that is more predictable (and more effective) than a manner in which scheduler device 110 may manage another network devices associated with other UE that are mobile.

As further shown in FIG. 1B, and by reference number 126, path identification module 114 of scheduler device 110 may, based on the request received, identify a download path from storage device 108 to user equipment 102. For example, based on the request of user equipment 102 received by the request module 112, path identification module 114 of scheduler device 110 may identify the download path for downloading the content item. For instance, path identification module 114 may identify information regarding the download path. The information regarding the download path may include information regarding one or more network devices (such as network device 106) that make up the download path.

In some implementations, the download path may be determined based on a topology map of connected network devices both inside and outside a provider network. The topology map may be generated and maintained by scheduler device 110. In an example, scheduler device 110 may interface with a network management system (NMS) application. The NMS application may be software that may have features that include end-to-end network management capabilities, such as network planning, optimization, and/or automation, among other examples. The NMS application may provide capabilities to scheduler device 110 that enable both the identification of the download path and the control of network devices that make up the network path.

Because the download path may be identified by scheduler device 110 to improve network communication, the topology map can, in some implementations, also provide status and capabilities information regarding capabilities and status of different network devices. In an example, based on the status and capabilities information, network devices with less advantageous setting may be selected by scheduler device 110 to have settings altered to improve device bandwidth and throughput. As noted above, by interfacing with the NMS applications, an example implementation may receive current or projected information about the status of network devices (e.g., current routing settings of network devices, projected routing settings of the network devices, available bandwidth for the network devices, utilization, and route congestion). Based on the status of network devices between storage device 108 and user equipment 102, the download path may be identified by selecting a combination of network devices (including network device 106) based on predicted durations for delivery of the content item via different routes. The download path may be identified based on factors that include the number of hops required for the example download path, the resources of network devices (on the route) that may be temporarily allocated for the download, and the presence of route congestion from public events and/or infrastructure outages. In other words, the download path may be identified by taking into account the preferred access needed to deliver the content item (e.g., a large file) in the shortest possible duration of time, while maintaining minimal hops between storage device 108 and user equipment 102. Once identified by scheduler device 110, the download path may be implemented for the download by, for example, using NMS functions to configure routing tables of the network devices to direct the download traffic (that includes the content item) along the identified download path (e.g., from storage device 108 to user equipment 102).

While the description herein references particular examples of network devices that may have operation settings controlled by scheduler device 110, the description herein is broadly applicable to any combination of network devices on a download path. The combination of network devices 106 may include any combination of data center servers, core network nodes, gateways, access network nodes, edge nodes, session management servers, routers, and/or switches.

As shown in FIG. 1C, and by reference number 128, the duration module 116 of scheduler device 110 may determine a duration of time to allocate for downloading of the content item. For example, a duration of time may be determined for downloading of the content item to user equipment 102 from storage device 108 via a download path that includes network device 106. In some implementations, as shown in FIG. 1B and described further with FIG. 1C below, the identified download path may include one or more network devices. For example, the download path identified between storage device 108 and user equipment 102 includes network device 106.

Returning to the game console example, to facilitate delivery of the game update to game console, scheduler device 110 may be provided an interface to manage aspects of the gaming console as a network device 106 to facilitate the delivery of the large content item, e.g., sleep and wake times, scheduled time to receive and process updates. In an additional example of scheduler device 110 interfacing with external data sources, network device 106 may be an MEC device where the gaming update may be pre-cached by scheduler device 110 for delivery to multiple gaming console user equipment 102. In this example, storage device 108 (e.g., the pre-caching storage device) can be a resource allocated to store the gaming update to be repeatedly accessed over time, or for a limited duration of time as a one-time update.

As further shown in FIG. 1C, and by reference number 130, the resource allocation module 118 of scheduler device 110 may allocate for the duration of time, a resource of a network device to download the content item to the UE. For example, the resource allocation module 118 may allocate for the duration of time, the resource of network device 106 to download the content item from storage device 108 to user equipment 102, via the download path. As described herein, a resource of network device 106 can be any component or setting of network device 106 that may affect the relaying of the content item from storage device 108 to user equipment 102. For example, when elements of a core network are identified as network device 106 in the download path, resources of network device 106 that may be allocated include settings applied to a router, a gateway, a fiber optic cable system, and/or the like. In some implementations, the setting can relate to rapidly moving data toward user equipment 102. For example, the setting may include available bandwidth, caching settings, and/or fiber optic cable utilization, among other examples.

Other settings that may be altered by scheduler device 110 include the routing algorithm being used by network device 106 on the download path. For example, implementations described herein can select a routing algorithm to be used by network device 106 that impacts the speed of content delivery by prioritizing speed over other factors, such as congestion control. Another setting that can be altered for network device 106 is the QoS settings that prioritize resources allocated to different types of network traffic. For example, QoS settings may be adjusted to improve the speed of content delivery by prioritizing for network device 106, traffic associated with downloading the content item over other selected network traffic (e.g., bandwidth for emergency use traffic can be maintained while other, non-emergency traffic may be temporarily assigned a lower priority).

Resources of the base station may be allocated in coordination with network backhaul functions that track the size of the content item and an estimated number of partitions to be used to download the content item to user equipment 102. In some examples, the content item may be downloaded by way of partitions. Using partitions to download the content item may refer to a process of breaking down a large content item into smaller pieces that can be transmitted more efficiently over the wireless network (e.g., to improve the use of network resources allocated for transmission of the content item and/or to enable a reliable transmission of the content item). In some examples, endpoint devices may determine implementation of the partitions. The network backhaul functions may be aware of the buffer status of the network devices included in the download path and may modify the allocation of resources (of the network devices) based on the buffer status. The buffer status may remain the same, for a substantial period of time, for large content items. In some implementations, scheduler device 110 may determine a partition size for the content item based on the current and/or projected buffer status of the network devices included in the download path. In some examples, buffer space of network device 106 may be available and/or resources of network device 106 may be allocated by scheduler device 110 for the download of the content item. In this regard, performance may be improved by specifying the use of larger partition sizes to utilize the available buffer space and/or by requesting as many resources as possible to be allocated for the download, until the buffer status changes. In other words, optimization of the download of the content item may include requesting as much resources as possible until a change in buffer status occurs.

In some implementations, network device 106 may be a radio resource control (RRC) device associated with a base station and the RRC device may determine a number of partitions to be used for wireless transmission of the content item. The number of partitions may be changed by implementations based on network conditions and/or a level of download performance to be achieved. The number of partitions for a large content item may be decreased in order to improve the download speed of the content item. In some implementations, scheduler device 110 may use the number of partitions of the content item to estimate the time needed for downloading the content item.

Determining the duration of time may include determining the duration of time for resource allocation based on a priority (e.g., a priority associated with the UE and/or the subscriber). In some implementations, the scheduler device may verify the priority before allocating the resource of the network device to download the content item to the UE. Verifying the priority may include, in some examples, verifying the priority based on an authorized list of subscribers, (e.g., including subscriber information).

In some implementations, the temporary preferential downlink access may be affected by enhancing a profile of the user for a selected, temporary amount of time (e.g., by pushing an access policy specific to a subscriber International Mobile Subscriber Identity (IMSI)). In other examples, the enhanced subscriber profile may be used to select an amount of priority to grant for the download (e.g., with this priority potentially affecting allocation of resources to other subscribers for different activities).

In addition to the duration of time to allocate a resource for downloading the content item, in some implementations, the time of day for the resource allocation may be selected based on a characteristic of the request (e.g., a requested completion time included in the request).

In some implementations, the duration of time may be determined based on a sleep pattern of user equipment 102 that indicates when user equipment 102 will likely be active to download the content item. This sleep pattern associated with user equipment 102 may be analyzed and the time of day for resource allocation can be based on this analysis. For example, to facilitate delivery of content items, scheduler device 110 may access device sleep time data from one or more of UE and analyze the data to select times and durations when user equipment 102 is likely to be active (or able to be activated) to receive the download.

This analysis of capability and activity patterns may also be used, by scheduler device 110, to select times of day and durations based on other predicted network environment factors (e.g., an amount of traffic congestion, an available bandwidth of network devices, and/or data demand at different times of particular days, among other examples).

In some implementations, scheduler device 110 may further include determining, after completion of the duration of time, that the download of the content item has not been completed, and allocating, by the scheduler device, an additional duration of time for downloading of the content item, based on the download of the content item not being completed. In some implementations, the additional duration is selected based on a remaining part of the content item to be downloaded. Additionally or alternatively, the additional duration of time may be selected based on the priority determined for the UE.

After the resource has been allocated for the duration time, scheduler device 110 may cause the content item to be provided from storage device 108 to user equipment 102. Scheduler device 110 can improve the performance of the download of the content item, while minimizing potential disruption of other aspects of a wireless network used for downloading the content item. For example, by managing the allocation of resources for downloading the content item, scheduler device 110 can help to maintain high performance for the download, as well as maintain high performance for other devices utilizing the wireless network.

Scheduler device 110 improves the user experience by reducing the wait time for the content item, and thus reducing the likelihood that user equipment 102 will switch to a faster and more reliable way of receiving broadband access. Additional benefits of some implementations described herein include reducing the amount of time that a large content item (being downloaded) consumes network resources. Improving the efficiency of downloading large content items using a wireless connection can reduce the inefficient utilization of network resources, computing resources, among other resources that would have otherwise been inefficiently allocated to download the large content items.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
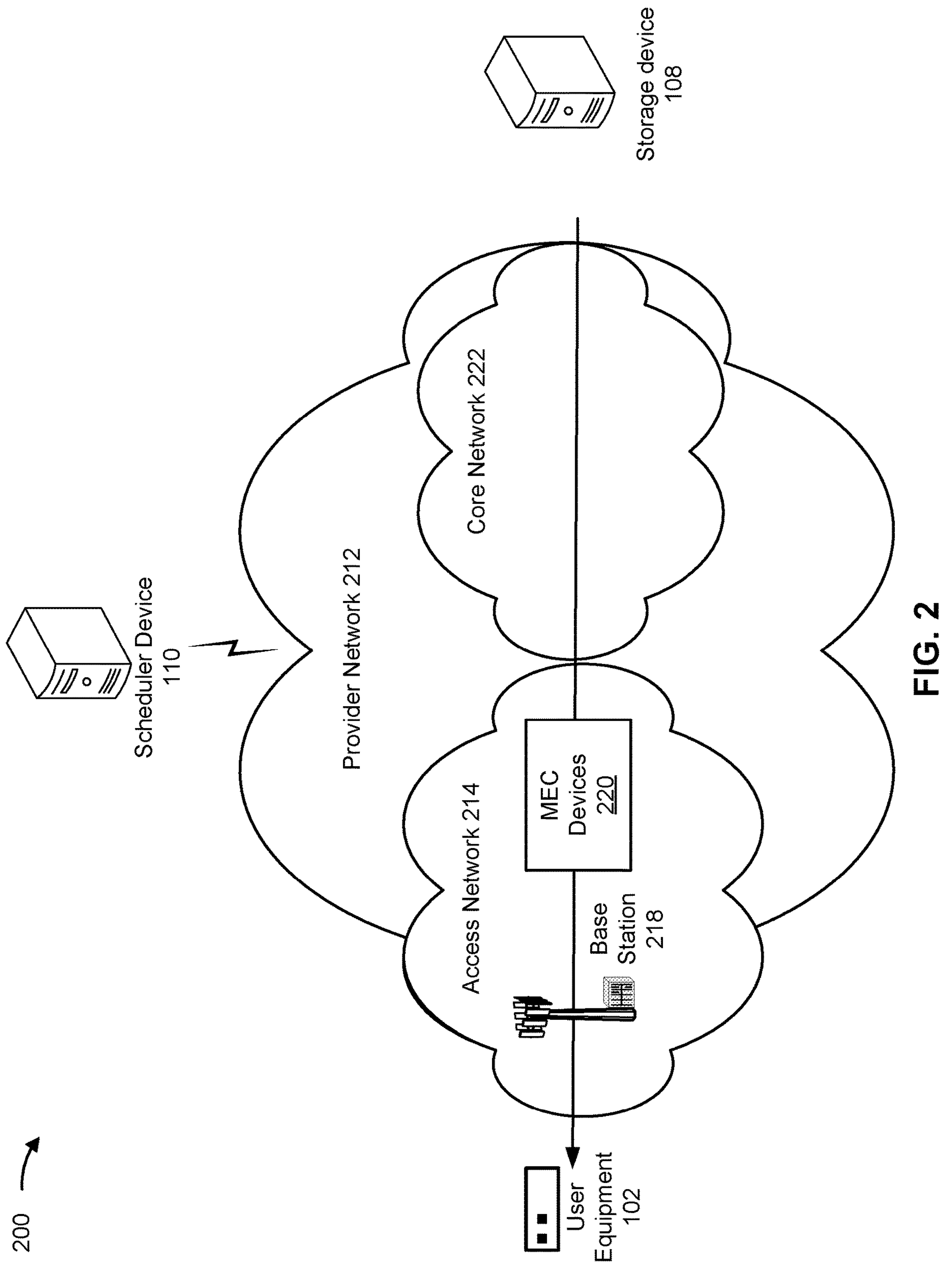
FIG. 2 is a diagram of an example environment in which systems and/or methods described herein may be implemented.

FIG. 2 is a diagram of an example environment 200 in which systems and/or methods for providing temporary preferential downlink access for downloading content items described herein may be implemented. As shown in FIG. 2, environment 200 may include user equipment 102, storage device 108, scheduler device 110, and a provider network 212 that includes an access network 214 and a core network 222. User equipment 102, storage device 108, and scheduler device 110 have been described above in connection with FIGS. 1A-1C. Devices of environment 200 may interconnect via wired connections, wireless connections, or a combination of wired and wireless connections.

User equipment 102 includes one or more devices capable of receiving, generating, storing, processing, and/or providing information associated with temporary preferential downlink access, as described elsewhere herein. User equipment 102 may include a communication device and a computing device. For example, user equipment 102 may include a FWA device, a mobile wireless communication device, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, user equipment 102 may be an endpoint of a download path from storage device 108 and may receive the content item from storage device 108.

Storage device 108 may include a device or collection of devices that store content items for retrieval, such as a data storage component located outside of provider network 212 that is accessed by core network 222 components. While the description herein references storage device 108 as being located outside of provider network 212, the description herein is applicable to any combination of storage devices located inside and/or outside provider network 212. For example, a content delivery network (CDN) located in access network 214 may be used in different examples to reduce latency and improve the user experience by caching content on servers that are geographically closer to end-users (e.g., caching content on MEC devices 220). Fig.

Scheduler device 110 includes a device or a collection of devices that may allocate a resource of network device 106 to facilitate temporary preferential downlink access to user equipment 102 to download the content item. In some examples, scheduler device 110 may be included in provider network 212, in a cloud computing environment, and/or in a data center.

Provider network 212 may include different networks that perform different functions in the 5G wireless network. For example, access network 214, and/or core network 222 discussed below, may include fiber optic cables, microwave links, and other technologies that enable high-speed data transfer between different network elements.

In some implementations, provider network 212 may include, or be connected to, one or more wired and/or wireless networks. For example, provider network 212 may include a cellular network, a public land mobile network (PLMN), a local area network (LAN), a wide area network (WAN), a private network, the Internet, and/or a combination of these or other types of networks. Provider network 212 may enable communication among the devices of environment 200. For example, provider network 212 may facilitate the downlink connection between storage device 108 and user equipment 102, via the download path depicted in FIGS. 1B-1C and FIG. 2.

Access network 214 (also termed radio access network (RAN)) includes one or more devices that coordinate communicating with user equipment 102 using a cellular radio access technology (RAT) (e.g., using base station 218 discussed below). In provider network 212, access network 214 may communicate traffic between user equipment 102, other access networks, and/or core network 222. Access network 214 may include MEC devices 220 that enable computing and storage resources to be placed at the edge of the network, closer to end users.

Base station 218 may include a base transceiver station, a radio base station, a node B, an evolved node B (eNB), a 5G next generation Node B (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 218 has the same characteristics and functionality of access network 214, and vice versa. As depicted, base station 218 may be included in access network 214.

MEC devices 220 may include servers or other computing devices that may provide computing and storage resources to be placed at the edge of the network and allow for low-latency processing of data and applications.

Core network 222 includes various types of core network architectures, such as a 5G next generation (NG) core, and a long-term evolution (LTE) evolved packet core (EPC), among other examples. Core network 222 may be a central part of the provider network 212 network that may connect different access networks 214 and MEC devices 220 to each other. Core network 222 may include routers, switches, and other networking equipment that may enable high-speed data transfer and processing. In some implementations, core network 222 may be implemented on physical devices, such as a gateway, a mobility management entity, and/or the like. Implementations of the hardware and/or software of core network 222 may be virtualized (e.g., through the use of network function virtualization and/or software-defined networking), thereby allowing for the use of composable infrastructure when implementing core network 222.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
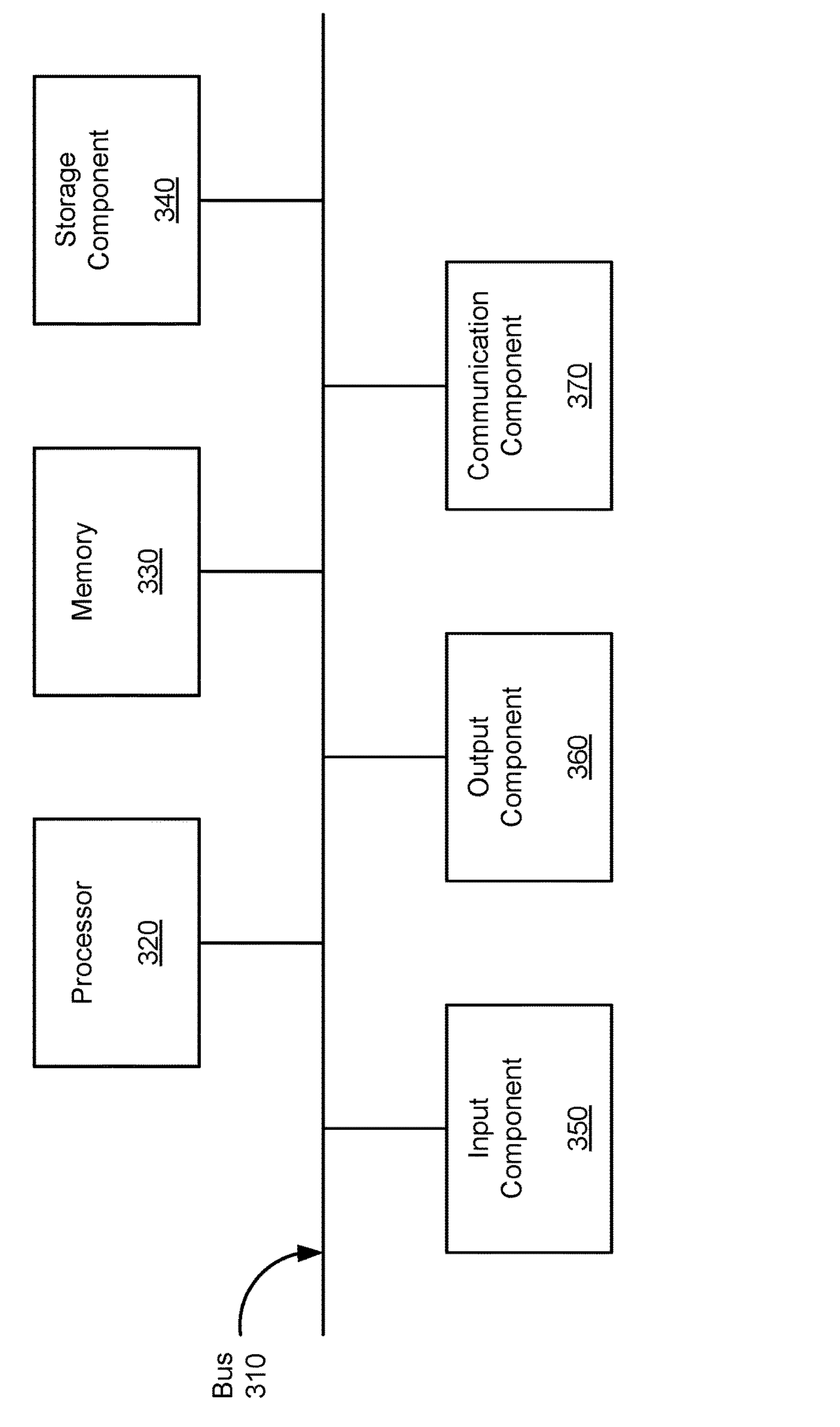
FIG. 3 is a diagram of example components of one or more devices of FIG. 2.

FIG. 3 is a diagram of example components of a device 300, which may correspond to one or more of a user equipment 102, network device 106, a storage device 108, a scheduler device 110, base station 218, MEC devices 220, one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
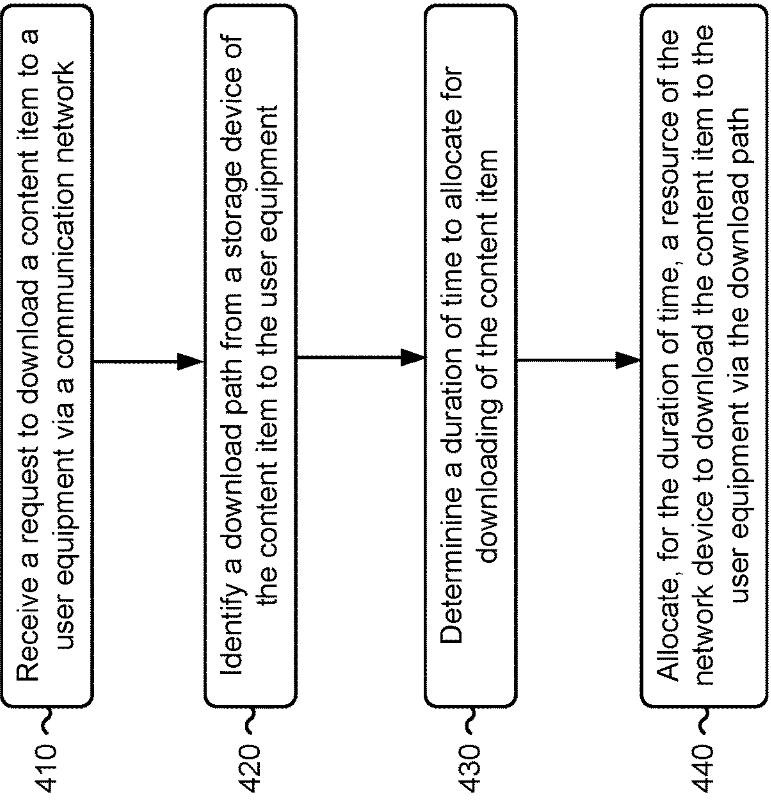
FIG. 4 is a flowchart of an example process relating to providing temporary preferential downlink access for downloading content items.

FIG. 4 is a flowchart of an example process 400 associated with systems and methods for temporary preferential downlink access. In some implementations, one or more process blocks of FIG. 4 may be performed by a scheduler device (e.g., scheduler device 110). In some implementations, one or more process blocks of FIG. 4 may be performed by another device or a group of devices separate from or including the scheduler device, such as a user equipment (e.g., user equipment 102), a network device (e.g., network device 106), a storage device (e.g., storage device 108), a base station (e.g., base station 218), an MEC device (e.g., MEC devices 220). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a request to download a content item to a user equipment via a communication network (block 410). For example, the scheduler device may receive a request to download a content item to a user equipment via a communication network, as described above. Receiving the request may include receiving the request from the user equipment. In some implementations, the user equipment may be a fixed wireless access device coupled to the communication network via the network device, with the network device being a base station, and the communication network being a wireless network.

As further shown in FIG. 4, process 400 may include identifying a download path from a storage device of the content item to the user equipment (block 420). For example, the scheduler device may identify a download path from a storage device of the content item to the user equipment, with the download path including a network device of the communication network, as described above. In some implementations, the download path comprises a network device of the communication network.

As further shown in FIG. 4, process 400 may include determining a duration of time to allocate for downloading of the content item (block 430). For example, the scheduler device may determine a duration of time to allocate for downloading of the content item, with the duration of time being determined based on subscriber information associated with the user equipment, the download path, and a size of the content item, as described above. In some implementations, determining a duration of time may include determining the duration of time based on subscriber information associated with the user equipment, the download path, and a size of the content item.

Some implementations of process 400 may further include, after completion of the duration of time, determining that the download of the content item has not been completed, and further, that an additional duration of time of resource allocation be provided for completing the downloading of the content item. In some implementations, the allocated resource comprises a bandwidth of the base station available for transmission, and the duration of time may be determined based on the bandwidth. Determining the duration of time may also be based, in some implementations, on a number of partitions to be used by the base station to download the content item to the user equipment.

As further shown in FIG. 4, process 400 may include allocating, for the duration of time, a resource of the network device to download the content item to the user equipment (block 440). For example, the scheduler device may allocate, for the duration of time, a resource of a network device to download the content item to the user equipment according to the download path, as described above.

Determining the duration of time may include determining the duration of time based on a priority, e.g., a priority associated with the user equipment and/or the subscriber. In some implementations, the scheduler device may verify the priority before allocating the resource of the network device to download the content item to the user equipment. In some implementations, verifying the priority comprises verifying the priority based on an authorized list of subscribers, e.g., including subscriber information.

In some implementations, process 400 can include selecting, by the scheduler device, a time of day to allocate the resource, with the time of day being selected based on a characteristic of the request and the duration of time. In some implementations, allocating the resource comprises allocating resources to download the content item at the time of day. Process 400 may further include, in some implementations, analyzing a sleep pattern associated with the user equipment, and selecting the time of day can include selecting the time of day based on analysis of the sleep pattern indicating that the user equipment will be active at the time of day.

In some implementations, process 400 further includes determining, by the scheduler device, after completion of the duration of time, that the download of the content item has not been completed, and allocating, by the scheduler device, an additional duration of time for downloading of the content item, based on the download of the content item not being completed. In additional implementations, the additional duration is selected based on a remaining part of the content item to be downloaded. In additional or alternative implementations, the additional duration of time may be selected based on the priority determined for the user equipment.

In some implementations, the duration of time may be determined based on a sleep pattern of the user equipment that indicates when the user equipment will likely be active to download the content item.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware may be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a scheduler device, a request to download a content item to a user equipment via a communication network;

identifying, by the scheduler device, a download path from a storage device of the content item to the user equipment, wherein the download path comprises a network device of the communication network;

determining, by the scheduler device, a priority for allocating one or more resources for downloading the content item to the user equipment, wherein the priority is determined based on subscriber information associated with the user equipment, and wherein the priority indicates preferential access to the one or more resources;

determining, by the scheduler device, a duration of time to allocate for downloading of the content item, wherein the duration of time is associated with the preferential access, wherein the duration of time is determined based on the subscriber information associated with the user equipment, the download path, and a size of the content item, and wherein the subscriber information includes at least one of a serial number of the user equipment, a network address associated with the user equipment, or an international mobile subscriber identity associated with the user equipment; and allocating, by the scheduler device, for the duration of time, a resource of the network device to download the content item to the user equipment via the download path.

2. The method of claim 1, further comprising:

determining, by the scheduler device, after completion of the duration of time, that the download of the content item has not been completed; and allocating, by the scheduler device, an additional duration of time for downloading of the content item, based on the download of the content item not being completed.

3. The method of claim 1, wherein the user equipment comprises a fixed wireless access device coupled to the communication network via a base station, wherein the communication network comprises a wireless network, wherein the network device comprises the base station, and wherein the resource comprises a bandwidth of the base station.

4. The method of claim 3, wherein determining the duration of time comprises:

determining the duration of time based on the bandwidth.

5. The method of claim 1, further comprising:

selecting, by the scheduler device, a time of day to allocate the resource, wherein the time of day is selected based on a characteristic of the request and the duration of time, and wherein the resource is allocated to download the content item at the time of day.

6. The method of claim 5, wherein selecting the time of day includes:

analyzing a sleep pattern associated with the user equipment; and selecting the time of day based on analysis of the sleep pattern indicating that the user equipment will be active at the time of day.

7. The method of claim 1, wherein the subscriber information comprises a priority assigned to the user equipment, wherein the method further comprises verifying, by the scheduler device, the priority before allocating the resource, wherein verifying the priority is based on an authorized list of subscribers, and wherein determining the duration of time is based on the priority.

8. A device, comprising:

one or more processors configured to:

receive a request to download a content item to a user equipment via a communication network;

identify a download path from a storage device of the content item to the user equipment, wherein the download path comprises a network device of the communication network;

verify a priority assigned to the user equipment, wherein the priority is verified based on subscriber information associated with the user equipment, and wherein the priority indicates preferential access to one or more resources for downloading the content item;

determine a duration of time to allocate for downloading of the content item, wherein the duration of time indicates a duration of the preferential access, wherein the duration of time is determined based on the priority, the download path, and a size of the content item;

allocate for the duration of time, a resource of the network device to download the content item to the user equipment; and allocate bandwidth to enable the content item to be downloaded at a rate that satisfies a rate threshold.

9. The device of claim 8, wherein to determine the duration of time, the one or more processors are configured to:

identify a completion time that the download of the content item is to be completed, wherein to allocate the resource, the one or more processors are configured to:

select a time of day to commence the downloading of the content item, based on the completion time and the duration of time, and allocate the resource commencing at the time of day.

10. The device of claim 9, wherein to identify the completion time, the one or more processors are configured to identify the completion time based on a requested time specified by the request for completion of the download.

11. The device of claim 8, wherein to receive the request, the one or more processors are configured to receive the request from the user equipment.

12. The device of claim 8, wherein the user equipment comprises a fixed wireless access device coupled to the communication network via the network device, wherein the network device comprises a base station, and wherein the communication network comprises a wireless network.

13. The device of claim 12, wherein the one or more processors are further configured to:

determine a number of partitions to be used by the base station to download the content item to the user equipment.

14. A non-transitory computer-readable medium storing a set of instructions, the set of instructions comprising:

one or more instructions that, when executed by one or more processors of a computing device, cause the computing device to:

receive a request to download a content item to a user equipment via a communication network;

identify a download path from a storage device of the content item to the user equipment, wherein the download path comprises a network device of the communication network;

determine a priority for allocating one or more resources for downloading the content item, wherein the priority is determined based on subscriber information associated with the user equipment, and wherein the priority indicates preferential access to the one or more resources for downloading the content item;

determine a duration of time to allocate for downloading of the content item, wherein the duration of time is determined based on the priority, the download path, and a size of the content item, and wherein the duration of time indicates a duration of the preferential access;

allocate for the duration of time, a resource of the network device to download the content item to the user equipment, the resource being allocated based on a buffer status of the network device;

determine after completion of the duration of time, that the download of the content item has not been completed; and allocate an additional duration of time for downloading of the content item, based on the download of the content item not being completed and the subscriber information.

15. The non-transitory computer-readable medium of claim 14, wherein the user equipment comprises a fixed wireless access device coupled to the communication network via a base station, wherein the network device comprises the base station, wherein the resource comprises a bandwidth of the base station, and wherein the communication network comprises a wireless network.

16. The non-transitory computer-readable medium of claim 15, wherein the one or more instructions, that cause the computing device to determine the duration of time, cause the computing device to:

determine the duration of time based on the bandwidth.

17. The non-transitory computer-readable medium of claim 14, wherein the one or more instructions, that cause the computing device to determine the duration of time, cause the computing device to:

determine the duration of time based on a sleep pattern of the user equipment that indicates when the user equipment will likely be active to download the content item.

18. The non-transitory computer-readable medium of claim 14, wherein the one or more instructions, when executed by the one or more processors, further cause the computing device to:

determine a priority assigned to the user equipment based on the subscriber information, wherein when the one or more instructions cause the computing device to determine the duration of time, the one or more instructions cause the computing device to determine the duration of time based on the priority.

19. The non-transitory computer-readable medium of claim 18, wherein the one or more instructions, that cause the computing device to allocate the additional duration of time, cause the computing device to:

select the additional duration of time based on the priority.

20. The non-transitory computer-readable medium of claim 14, wherein the one or more instructions, that cause the computing device to allocate the additional duration of time, cause the computing device to:

select the additional duration of time based on a remaining part of the content item to be downloaded.

* * * * *